Nov. 28, 1967    H. G. BECK    3,355,343
METHOD AND APPARATUS FOR BUTT SPLICING COATED FABRIC
Filed Dec. 30, 1963    3 Sheets-Sheet 1
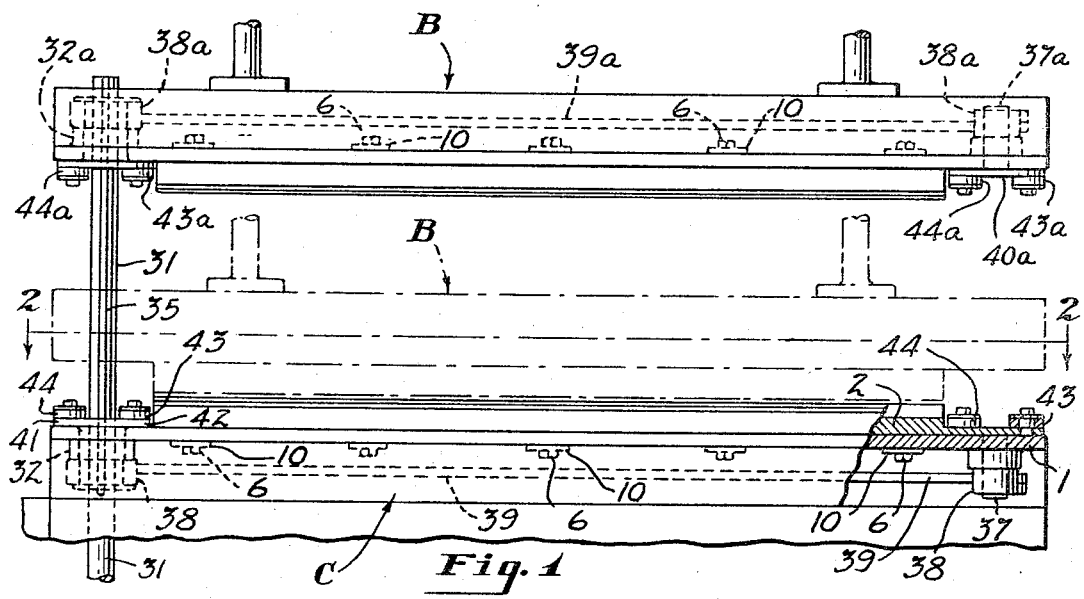
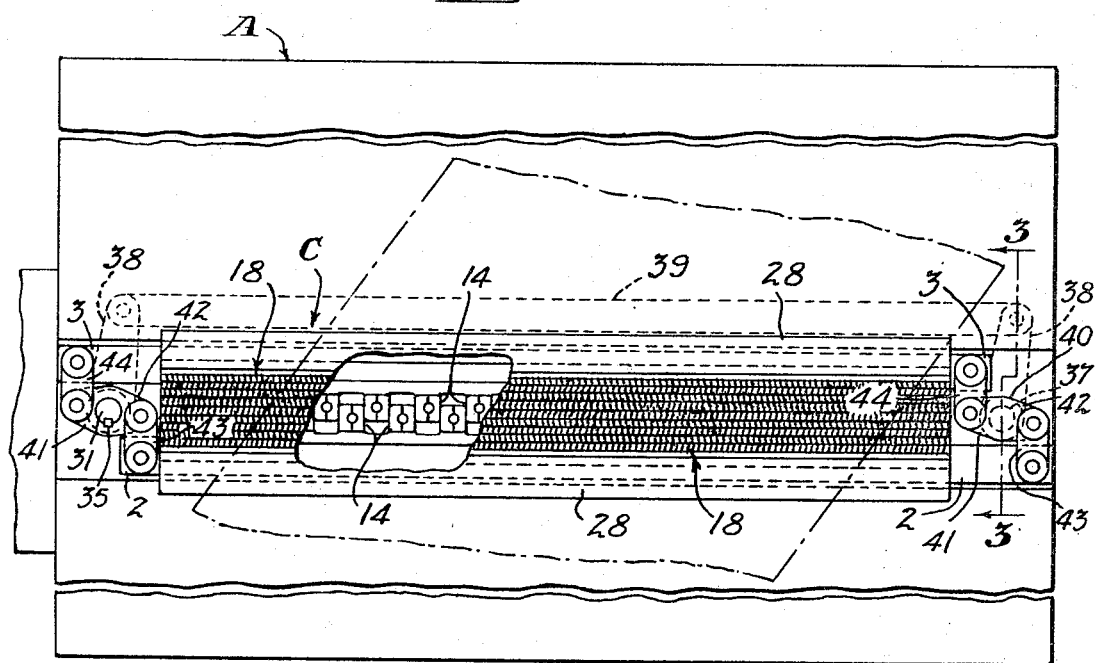
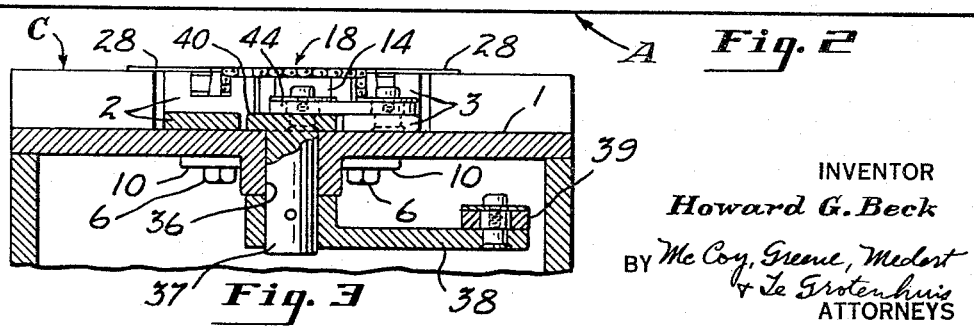
INVENTOR
Howard G. Beck
BY McCoy, Greene, Medert
& Te Grotenhuis
ATTORNEYS INVENTOR
Howard G. Beck
BY McCoy, Greene, Medert
& de Grootenhuis
ATTORNEYS Nov. 28, 1967   H. G. BECK   3,355,343
METHOD AND APPARATUS FOR BUTT SPLICING COATED FABRIC
Filed Dec. 30, 1963   3 Sheets-Sheet 3
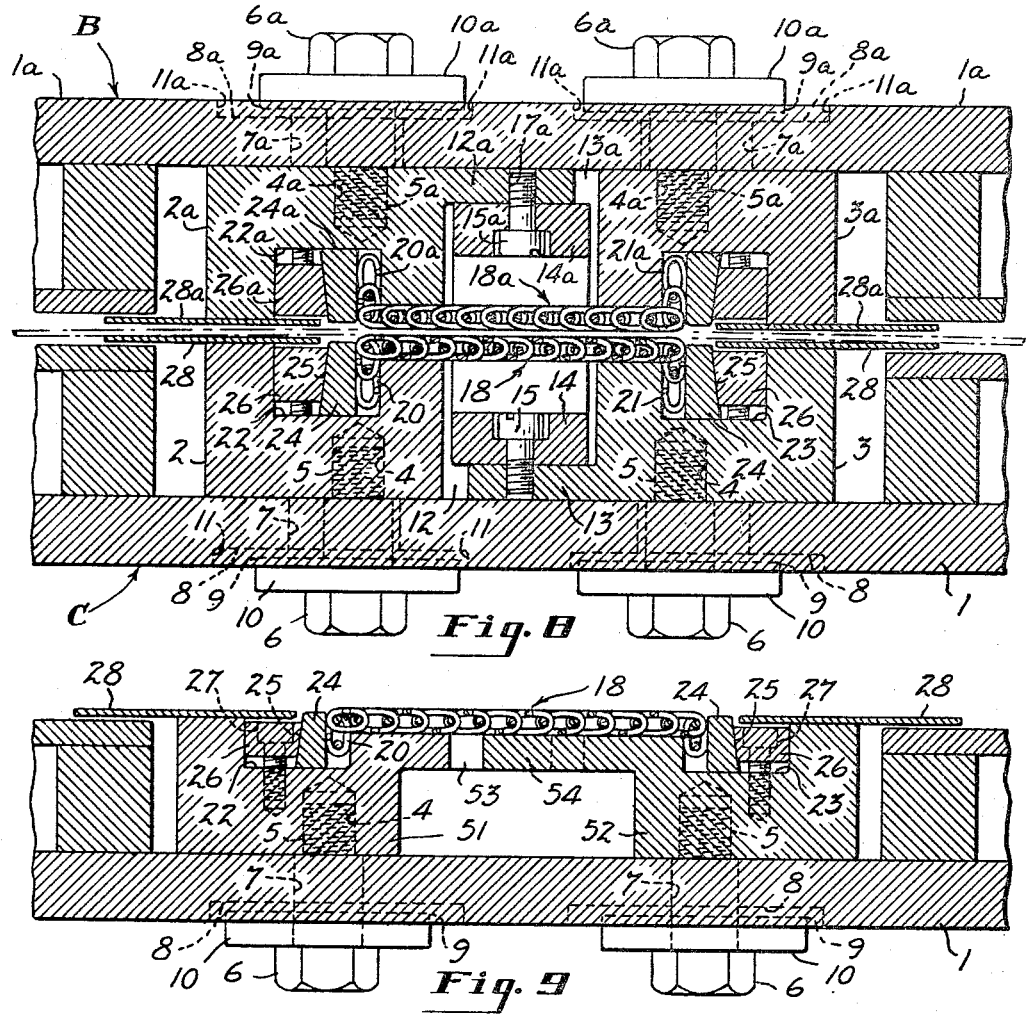
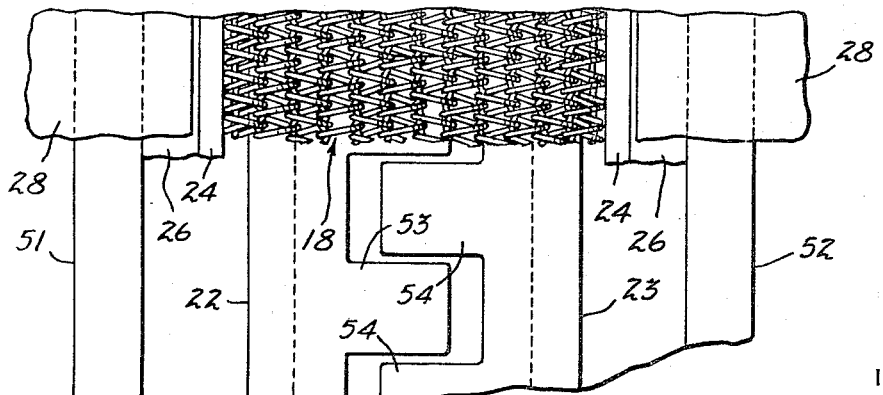
INVENTOR
Howard G. Beck
BY McCoy, Greene, Medest
& LeGrotenhuis
ATTORNEYS

United States Patent Office 3,355,343
Patented Nov. 28, 1967

3,355,343
METHOD AND APPARATUS FOR BUTT SPLICING COATED FABRIC
Howard G. Beck, Medina, Ohio, assignor to The General Tire & Rubber Company, Akron, Ohio, a corporation of Ohio
Filed Dec. 30, 1963, Ser. No. 334,243
10 Claims. (Cl. 156—304)

This invention relates to a method of and apparatus for splicing sheet material edge-to-edge and particularly to a machine for splicing together pieces of tire cord fabric to provide strips of indeterminate length suitable for use in building pneumatic tires.

The method of the present invention is directed primarily to the butt splicing of sheet material such as rubber-coated tire carcass fabric and provides for tightly gripping the marginal end portions of the material adjacent the line of splice between layers of flexible mesh and squeezing the end edges together while tightly gripped between said layers with sufficient pressure to integrally join the sheet material along the splice line. It has been found desirable in the manufacture of rubber articles such as tires which are formed of superposed plies of rubber coated cord fabric, to splice the cord fabric edge-to-edge without overlapping the fabric sheets. By so splicing the sheet material prior to curing, a more even cross section in the finished product is provided.

The method and machine of the present invention are particularly adapted to the butt splicing of ply stock reinforced by nylon or rayon cord fabric.

The present invention provides a novel method of pressing together the edges of the pieces of fabric to be spliced in which the ends of the pieces are clamped between layers of a loosely woven mesh belting. This is so woven that it may be widened or narrowed without a change in thickness. This mesh may be a woven galvanized wire mesh often used for conveyor belts and commonly known in the trade by the name "balanced weave." The pieces of rubberized fabric to be spliced are positioned with the edges to be joined in alinement and closely adjacent one another between two layers of the woven mesh belting. The mesh layers and the pieces to be spliced are clamped between two pairs of gripping members which have interfingered portions overlying the line of splice. With the wire mesh and fabric so gripped the gripping members are moved parallel to the plane of the fabric to decrease the width of the portions of the woven mesh overlying the edges to be joined and to cause the edges of the rubberized fabric to be pressed tightly together to form the splice.

The mesh belts may be formed of magnetic material and positioned on horse shoe magnets mounted on movable carrier bars and having their lines of flux perpendicular to the direction of the contracting movement of the mesh. The magnets exert a dragging force on the wire mesh as it contracts and provides for a more uniform collapse throughout its width.

It is an object of the present invention to provide a simple low-cost machine for providing a strong splice between pieces of uncured plastic material along a desired line of splice without overlapping the sheets of material to be spliced.

It is a further object of the present invention to provide a method and machine for making a butt splice of uniform strength throughout the thickness and width of the material.

Other objects, uses and advantages of this invention will become apparent from the following description as illustrated in the accompanying drawings in which like parts are designated by like numerals of reference throughout the several views.

Referring to the drawings:

FIGURE 1 is a side elevation of a machine embodying the present invention in which the upper platen assembly is shown in its upward material receiving position in solid lines and in downward splicing position in dashed lines;

FIGURE 2 is a top plan view of the same machine with parts broken away showing the working parts of the lower platen assembly and taken on the line 2—2 of FIGURE 1;

FIGURE 3 is a transverse sectional view of the lower platen assembly of the same machine taken on the line 3—3 of FIGURE 2;

FIGURE 8 is a fragmentary transverse sectional view of the same machine taken on the line 8—8 of FIGURE 1, showing the upper platen assembly in its downward splicing position and the mesh in its contracted splicing condition;

FIGURE 9 is a transverse sectional view of a modified form of machine embodying the present invention, showing the mesh in its laterally extended condition; and FIGURE 10 is a fragmentary top elevation of the modified form shown in FIGURE 9, showing the arrangement of the interfitting fingers of the lower platen.

Figure 4:
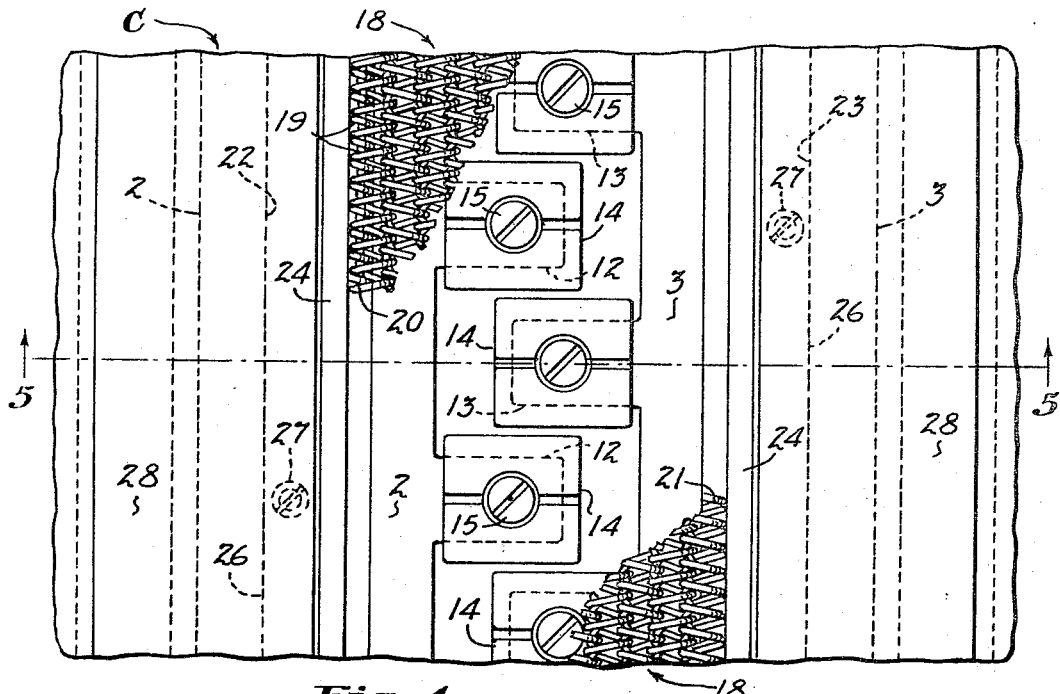
FIGURE 4 is a fragmentary top elevation of the same machine with parts broken away and showing the mesh in its laterally extended material receiving position.

Referring more particularly to the drawings, FIGURES 1–8 show a machine for butt splicing fabric reinforced tire carcass material and embodying the present invention. The machine is mounted on a stock table A and comprises a vertically movable upper platen assembly B and a fixed lower platen assembly C.

The upper platen assembly B is mounted for reciprocating movement between an upward stock receiving position shown in solid lines in FIGURE 1, and a downward splicing position shown in dashed lines in FIGURE 1. The vertical movement of the upper platen assembly B may be provided for by any of the means now known in the art such as through a pneumatic system coupled with mechanical linkage of the type shown in U.S. patent application Ser. No. 215,018, filed Aug. 6, 1962, now U.S. Patent No. 3,206,067.

The splicing mechanisms of both the upper and lower platen assemblies B and C are adapted to operate concurrently and in cooperation with one another. The movements are synchronized through a mechanical linkage to be described below.

Since the operating parts of both the upper and lower platen assemblies B and C are substantially identical, the construction of the lower platen assembly C will first be described in detail in order to define the construction and operation of both platen assemblies. The parts of the upper platen assembly B will be designated by the same numerals as the corresponding parts of the lower platen assembly but such numerals will be followed by the letter "a."

The lower platen assembly C has a bearing plate 1 mounted on the stock table A which supports the operating parts of the lower platen assembly C. Slidably carried by the bearing plate 1 are carrier bars 2 and 3 adapted for lateral movement toward and away from one another. Each of the bars 2 and 3 has a plurality of circular threaded cavities 4, each of which receives the threaded shank portion 5, of a mounting bolt 6 used to attach the carrier bars 2 and 3 to the bearing plate 1. The bolts 6 are slidably received in oval shaped openings 7 in the bearing plate 1, each of such openings 7 being located in a rectangular slot 8 located in the bottom face of the base plate 1.

Figure 6:
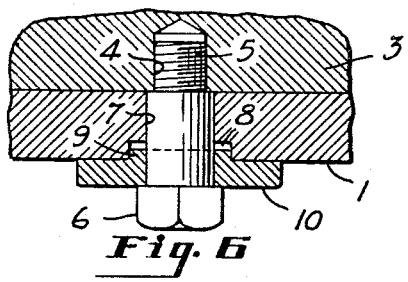
FIGURE 6 is a fragmentary longitudinal sectional view of the same machine taken on the line 6—6 of FIGURE 5.
Figure 7:
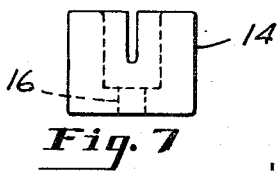
FIGURE 7 is a side elevation of a magnet of the type which may be used in the machine of the present invention.

Each of the rectangular slots 8 is adapted to slidably receive a ridge portion 9 of a circular washer 10 mounted on the bolt 6. The ridge portion 9 of each washer 10 provides a key which guides the lateral movement of the carrier bars 2 and 3. As shown in FIGURE 6, the longitudinal edges of the ridge portion 9 fit closely adjacent the side walls of the slots 8 and thus prevent endwise movement of the carrier bars 2 and 3 but permit lateral movement of the carrier bars 2 and 3 within the limits provided by the end walls 11 of the slots 8. The bolts 6 hold the washers 10 against the bottom surface of the bearing plate 1 adjacent the rectangular slots 8 to prevent vertical movement of the carrier bars 2 and 3 relative to the bearing plate 1.

Each of the carrier bars 2 and 3 has a plurality of inwardly extending interfitting fingers 12 and 13 located adjacent the bearing plate 1. Mounted on each of the fingers 12 and 13 is a horseshoe magnet 14 of the type shown in FIGURE 7. Each pole of the magnets 14 extends upwardly from the fingers 12 and 13 and the lines of flux between the poles are generally oriented in paths parallel to the desired line of splice. The poles of the magnets mounted on the fingers 13 are placed adjacent like poles of the magnets mounted on the fingers 12 so that the lines of flux will not normally cross between adjacent magnets but will be confined substantially between the poles of each individual magnet. Thus the positive poles of the magnets mounted on the fingers 13 are adjacent the positive poles of the magnets mounted on the fingers 12 and the negative poles of the magnets mounted on the fingers 13 are likewise adjacent the negative poles of the magnets mounted on the fingers 12.

The magnets 13 are mounted on the carrier bars 2 and 3 by machine screws 15 which pass through a circular opening 16 in each magnet 14 and engage threaded openings 17 in the fingers 12 and 13.

The top faces of the magnets 14 are level with the adjacent top surfaces of the carrier bars 2 and 3 and form therewith a relatively flat surface which supports a layer or belt of flexible, laterally yieldable mesh 18 which preferably comprises a plurality of interfitting lengths 19 of helically wound wire coils which are connected in interfitting relationship by wire rods extending through the interspaced helical lengths to form a flexible woven layer. The helical lengths are preferably flattened to provide a more even surface for the mesh layer. The mesh may be of the type having the trade designation "balanced weave," a woven belting of galvanized wire mesh commonly used for conveyor belts, and is in the form of a belt extending from one end of the lower platen assembly C to the other along the desired line of splice. The longitudinal edge portions 20 and 21 of the mesh belt are fastened to the carrier bars 2 and 3 and the mesh is laterally yieldable in the direction of movement of the carrier bars 2 and 3 so that it will collapse or contract in response to inward splicing movement of the carrier bars 2 and 3 and will extend or spread out laterally in response to outward movement of the carrier bars.

Figure 5:
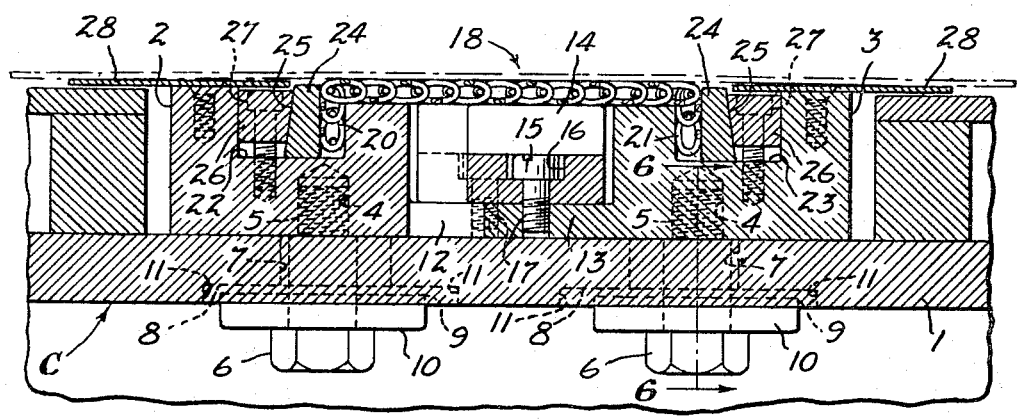
FIGURE 5 is a fragmentary transverse sectional view of the same machine taken on the line 5—5 of FIGURE 4.

As shown in FIGURES 5 and 8, the longitudinal edge portions 20 and 21 of the mesh are fastened in longitudinal slots 22 and 23 in the carrier bars 2 and 3. Also mounted in the slots 22 and 23 are adjustable clamping bars 24 which are used to tightly clamp the longitudinal edge portions 20 and 21 of the mesh 18 against the walls of the slots 22 and 23. The clamping bars 24 each have a slanted face 25 which bears against a wedge member 26.

The wedge members 26 are tightly fastened to the carrier bars 22 and 23 by machine screws 27 and serve to force the clamping bars 24 tightly against the longitudinal edge portions 20 and 21 of the mesh 18 as shown in FIGURES 5 and 8.

Also mounted on the carrier bars 2 and 3 are material supporting plates 28 which extend outwardly from the top surface carrier bars 2 and 3 and across a portion of the top surface of the stock table A. The material supporting plates 27 and the mesh belt 18 form a relatively flat surface for receiving the marginal end portions of the two pieces of material to be spliced. When the pieces of material are suitably aligned edge-to-edge along a desired line of splice which corresponds substantially to the center line of the lower platen assembly C, the upper platen assembly B with its corresponding operating parts is lowered to its splicing position as shown in FIGURE 8 where its corresponding belt of mesh 18a is brought into engagement with the top surface of the marginal end portions of the material. Pressure is then applied to tightly grip the edges of the material between the mesh belts 18 and 18a and the carrier bars 2, 3, 2a and 3a, in both platen assemblies are moved inwardly towards one another whereby the contracting mesh moves the end edges of the material together into uniform engagement along the entire line of splice.

The magnets 14 exert a dragging force on the individual helical lengths 19 of the mesh and thus tend to provide for a uniform lateral collapsing or contracting of the mesh as the carrier bars are moved together rather than progressive contraction beginning at the longitudinal sides of the mesh and progressing inwardly as the carrier bars 2 and 3 move closer together. The contracting of the mesh causes the end edges of the material to be spliced to move into engagement with each other before the carrier bars 2 and 3 complete their inward splicing movement so that the material is uniformly joined throughout the entire line of splice. The continued collapse of the mesh 18 tends to squeeze the end edges of the uncured rubber material tightly together and with the vertical force applied by the upper platen assembly B, causes the material to adhere and make a tightly bonded splice.

The synchronized splicing movement of the carrier bars 2, 3, 2a and 3a, of both the upper and lower platen assemblies B and C is provided for by a mechanical linkage of the type herein shown and described but may be provided for by any suitable means now known in the art. The linkage includes a circular shaft 31, rotatably mounted in the lower platen assembly C in a circular bearing sleeve 32 formed by circular walls 33 extending from the bearing plate 1. The shaft 31 extends upwardly from the lower platen assembly C and through a bearing sleeve 32a formed by a circular wall in the bearing plate 10 of the upper platen assembly B. The shaft 31 has a longitudinal slot 34 which receives a key 35 which serves to slave the mechanical linkage of the upper platen assembly B to the mechanical linkage of the lower platen assembly C.

Since the linkages in both platen assemblies B and C are substantially identical, a description of the linkage of lower platen assembly C will serve to define the structure and function of the linkage of both.

Rotatably mounted at the front of the lower platen assembly C in a cylindrical sleeve formed by a circular wall 36 extending from the bearing plate 1 is a second shaft 37. Rigidly mounted to each of the shafts 31 and 37 below the base plate 1 of the lower platen assembly B is a crank arm 38 as best shown in FIGURE 3. The crank arms 38 are linked together by a bar 39 extending longitudinally across the lower platen assembly C beneath the bearing plate 1 so that the rotary movements of the crank arms 38 are interdependent and the shafts 31 and 37 rotate simultaneously with one another. Rigidly mounted on each of the shafts 31 and 37 is a toggle bar 40, having two outwardly extending arm portions 41 and 42. Pivotally connected to each outwardly extending arm portion 41 is a link 43, and to each arm portion 42 is a link 44, each link being pivotally connected to one of the carrier bars 2 and 3. The links 43 connected to the carrier bar 2 cause inward and outward movement of the carrier bar 2 in response to rotary movement of the shafts 31 and 37 and the links 44 attached to the carrier bar 3 cause the inward and outward movement of the carrier bar 3 in response to rotary movement of the shafts 31 and 37 and simultaneously with the movement of the carrier bar 2.

Thus when the crank arms 38 rotate counterclockwise, the carrier bars 2 and 3 move inwardly toward one another to provide the splicing movement of the lower platen assembly C and the carrier bars 2a and 3a of the upper platen assembly B which are slaved by the shaft 33 to the mechanical linkage of the lower platen assembly C move inward simultaneously.

FIGURES 9 and 10 show a modified form of a machine embodying the present invention wherein like parts are indicated by numerals corresponding to those of FIGURES 1-8. The machine of FIGURES 9 and 10 differs from the machine of FIGURES 1-8 primarily in that no magnets are used to support the mesh. As shown in FIGURE 9 the mesh is supported solely by carrier bars 51 and 52 which have interfitting fingers 53 and 54 extending from the top portions thereof to support the mesh during the splicing operation. The operation of the machine of FIGURES 9 and 10 is in all other respects identical to the machine of FIGURES 1-8.

It is to be understood that the above description and drawings are by way of illustration rather than limitation and that variations and modifications of the specific device herein shown and described may be made without departing from the spirit of the invention.

What I claim is:

1. A method of splicing rubberized tire cord fabric edge to edge which comprises placing the edges of two pieces of fabric to be spliced along a desired line of splice, gripping the marginal portions of said pieces adjacent the line of splice between two layers of laterally contractable mesh arranged for contracting movement perpendicular to the line of splice, and contracting said mesh layers to move the alined end edges of said material into engagement with one another and to squeeze said edges together to make a splice.

2. In a method of splicing rubber-coated tire cord fabric, the steps of positioning two sheets of material to be spliced with their ends adjacent and substantially in alinement along a desired line of splice, engaging the top and bottom surfaces of the marginal portions of both of said pieces of fabric adjacent said line of splice with layers of laterally yielding mesh, gripping said material between said mesh layers, and laterally contracting said mesh layers to squeeze the end edges of the pieces together to make a splice, and wherein said mesh is formed of a magnetic material and a dragging force is exerted on said mesh as it contracts by subjecting it to a magnetic force.

3. In an apparatus for butt splicing rubber coated tire cord fabric or other sheet material, which apparatus includes a lower platen assembly for sustaining vertical force and for supporting the marginal portions of two pieces of material positioned with their butt ends adjacent to make a splice line, an upper platen assembly located above said lower platen assembly and mounted for reciprocating motion relative to said lower platen assembly to engage material positioned thereon, and means for producing said reciprocating motion; a layer of laterally yielding mesh fabric positioned on each of said upper and lower platen assemblies substantially parallel to the faces of said platens to grip the marginal portions of said material; and means for laterally contracting said mesh layer to reduce its surface dimension perpendicular to said splice line and to squeeze the end edges of said material together to make a splice.

4. An apparatus as defined in claim 3 wherein said layers of mesh comprise a plurality of uniformly convoluted segments of wire helically wound to interfit with one another and longitudinal wires parallel to said convoluted wire segments inserted within two interfitting helical segments to flexibly join said segments, said segments being capable of relative movement inwardly and outwardly with respect to one another contract and extend a layer made up of a plurality of such interfitting segments.

5. An apparatus as defined in claim 3 wherein said layer of metal mesh comprises a plurality of interfitting wire elements, said elements being flexibly interconnected and capable of linear motion in a plane in two parallel directions, the lines of motion of each element being collectively parallel.

6. In an apparatus for butt splicing rubber coated tire cord fabric or other sheet material, which apparatus includes a lower platen assembly for sustaining vertical force and for supporting the marginal portions of two pieces of material positioned with their butt ends adjacent to make a splice line, an upper platen assembly located above said lower platen assembly and mounted for reciprocating vertical motion relative to said lower platen assembly to engage material positioned thereon, and means for producing said reciprocating motion; a layer of laterally yielding mesh on said lower assembly located along said splice line for engaging the marginal portions of said material, with its variable dimension substantially perpendicular to said splice line, a second layer of laterally yielding mesh on said upper platen assembly located along said splice line for engaging the marginal portions of said material, with its variable dimension substantially perpendicular to said splice line, means for laterally contracting said mesh layers to reduce their surface dimensions perpendicular to said splice line and to push the butt ends of said material together to make a splice.

7. An apparatus as defined in claim 6 wherein said layers of mesh are held in contact with said upper and lower platens by magnets on the surface of said platens.

8. An apparatus as defined in claim 6 wherein said upper layer of mesh is held in contact with said supper platen by magnets on the surface of said upper platen.

9. An apparatus as defined in claim 6 wherein said mesh comprises parallel rows of helically wound wire having regularly spaced, axially alined, laterally elongated convolutions.

10. Apparatus for butt splicing rubber-coated tire cord fabric comprising a lower platen assembly for supporting the marginal portions of two pieces of tire cord fabric positioned with their butt ends adjacent to make a splice line, an upper platen assembly mounted to move toward and away from said lower platen assembly, and means for squeezing said butt ends together to form a splice comprising a layer of laterally yielding mesh fabric positioned on one of said platen assemblies substantially parallel to said pieces of fabric to grip the marginal portions thereof and means for laterally contracting said mesh layer to reduce its surface dimension perpendicular to said splice line.

References Cited

UNITED STATES PATENTS

| | | | |
|---|---|---|---|
| 2,027,854 | 1/1936 | Breth et al. | 156—503 |
| 2,103,920 | 12/1937 | Guba | 198—194 |
| 2,114,180 | 4/1938 | Guba | 198—194 |
| 2,186,286 | 1/1940 | Engler et al. | 156—122 |
| 2,562,540 | 7/1951 | Engler et al. | 156—503 |
| 2,675,854 | 4/1954 | Engler | 156—503 X |
| 2,687,209 | 8/1954 | Rost et al. | 198—199 |
| 2,888,059 | 5/1959 | George | 156—122 |
| 2,912,098 | 11/1959 | Manes et al. | 198—194 |

EARL M. BERGERT, *Primary Examiner.*

HAROLD ANSHER, *Examiner.*